US011718311B2

(12) United States Patent
Ge et al.

(10) Patent No.: US 11,718,311 B2
(45) Date of Patent: Aug. 8, 2023

(54) DATA INTEGRATION FROM MULTIPLE SENSORS

(71) Applicant: TUSIMPLE, INC., San Diego, CA (US)

(72) Inventors: Lingting Ge, San Diego, CA (US); Yijie Wang, San Diego, CA (US); Yiqian Gan, San Diego, CA (US); Jianan Hao, Beijing (CN); Xiaodi Hou, San Diego, CA (US)

(73) Assignees: TUSIMPLE, INC., San Diego, CA (US); BEIJING TUSEN WEILAI TECHNOLOGY CO., LTD., Beijing (CN)

( * ) Notice: Subject to any disclaimer, the term of this patent is extended or adjusted under 35 U.S.C. 154(b) by 510 days.

(21) Appl. No.: 16/813,180

(22) Filed: Mar. 9, 2020

(65) Prior Publication Data
US 2021/0181351 A1 Jun. 17, 2021

(30) Foreign Application Priority Data
Dec. 17, 2019 (CN) .......................... 201911306101.0

(51) Int. Cl.
*G06T 7/73* (2017.01)
*G01S 17/931* (2020.01)
(Continued)

(52) U.S. Cl.
CPC ............ *B60W 50/14* (2013.01); *B60W 10/20* (2013.01); *G01S 7/003* (2013.01); *G01S 17/89* (2013.01);
(Continued)

(58) Field of Classification Search
CPC ........ G01S 17/931; G01S 7/003; G01S 17/89; G01S 17/86; B60W 10/20;
(Continued)

(56) References Cited

U.S. PATENT DOCUMENTS 10,699,563 B1 * 6/2020 Oron ..................... G06K 9/6215
10,937,178 B1 * 3/2021 Srinivasan .............. G06T 7/521
(Continued)

OTHER PUBLICATIONS

Extended European Search Report for European Patent Application No. 20214442.4, dated May 12, 2021 (10 pages).
(Continued)

*Primary Examiner* — Anne Marie Antonucci
*Assistant Examiner* — Connor L Knight
(74) *Attorney, Agent, or Firm* — Paul Liu; Glenn Theodore Mathews; Perkins Coie, LLP (57) ABSTRACT

Disclosed are methods and devices related to autonomous driving. In one aspect, a method is disclosed. The method includes determining three-dimensional bounding indicators for one or more first objects in road target information captured by a light detection and ranging (LIDAR) sensor; determining camera bounding indicators for one or more second objects in road image information captured by a camera sensor; processing the road image information to generate a camera matrix; determining projected bounding indicators from the camera matrix and the three-dimensional bounding indicators; determining, from the projected bounding indicators and the camera bounding indicators, associations between the one or more first objects and the one or more second objects to generate combined target information; and applying, by the autonomous driving system, the combined target information to produce a vehicle control signal.

20 Claims, 6 Drawing Sheets

(51) Int. Cl.

| | |
|---|---|
| B60W 10/20 | (2006.01) |
| G01S 7/00 | (2006.01) |
| G01S 17/89 | (2020.01) |
| G05D 1/00 | (2006.01) |
| G05D 1/02 | (2020.01) |
| B60W 50/14 | (2020.01) |
| G06V 10/774 | (2022.01) |
| G06V 10/776 | (2022.01) |
| G06V 10/80 | (2022.01) |
| G06V 20/56 | (2022.01) |
| G06V 20/64 | (2022.01) |

(52) U.S. Cl.
CPC .......... *G01S 17/931* (2020.01); *G05D 1/0094* (2013.01); *G05D 1/0248* (2013.01); *G06T 7/74* (2017.01); *G06V 10/774* (2022.01); *G06V 10/776* (2022.01); *G06V 10/806* (2022.01); *G06V 20/56* (2022.01); *G06V 20/647* (2022.01); *B60W 2420/42* (2013.01); *B60W 2420/52* (2013.01); *G06T 2207/30244* (2013.01); *G06T 2210/12* (2013.01)

(58) Field of Classification Search
CPC ......... B60W 2420/42; B60W 2420/52; B60W 2554/00; B60W 50/14; B60W 60/001; G05D 1/0094; G05D 1/0248; G05D 2201/0213; G05D 1/0236; G05D 1/0221; G05D 1/0223; G05D 1/0251; G05D 1/0255; G05D 1/0276; G06T 7/74; G06T 2207/30244; G06T 2210/12; G06V 20/647; G06V 20/56; G06N 20/00; G06K 9/6256; G06K 9/629; G06K 9/6262
See application file for complete search history.

(56) References Cited

U.S. PATENT DOCUMENTS

| | | | |
|---|---|---|---|
| 11,010,907 B1* | 5/2021 | Bagwell | G06V 20/64 |
| 2018/0260613 A1* | 9/2018 | Gao | G06T 7/292 |
| 2019/0096086 A1* | 3/2019 | Xu | G01S 7/417 |
| 2019/0147610 A1* | 5/2019 | Frossard | G06V 20/58 |
| | | | 382/103 |
| 2019/0340775 A1* | 11/2019 | Lee | G05D 1/024 |
| 2020/0210726 A1* | 7/2020 | Yang | G06N 3/0454 |
| 2021/0166474 A1* | 6/2021 | Behar | G06K 9/6259 |
| 2021/0342609 A1* | 11/2021 | Smolyanskiy | G06V 20/56 |
| 2022/0080999 A1* | 3/2022 | Vora | G06N 3/0454 |

OTHER PUBLICATIONS

Asvadi, Alireza, et al., "3D Object Tracking using RGB and LIDAR Data", 2016 IEEE 19th International Conference on Intelligent Transportation Systems (ITSC), Rio de Janeiro, Brazil, Nov. 2016.
Banerjee, Koyel, et al., "Online Camera LiDAR Fusion and Object Detection on Hybrid Data for Autonomous Driving", 2018 IEEE Intelligent Vehicles Symposium (IV), Changshu, Suzhou, China, Jun. 2018.

* cited by examiner

DATA INTEGRATION FROM MULTIPLE SENSORS

CROSS-REFERENCE TO RELATED APPLICATION

This patent document claims priority to and benefits of Chinese Application Number 201911306101.0 of the same title and content that was filed on Dec. 17, 2019. The entire contents of the afore mentioned patent application are incorporated by reference as part of the disclosure of this patent documents.

TECHNICAL FIELD

This document relates to autonomous driving.

BACKGROUND

Autonomous driving uses sensor and processing systems that take in the environment surrounding the autonomous vehicle and make decisions that ensure the safety of the autonomous vehicle and surrounding vehicles. The sensors should accurately determine distances to, and velocities of, potentially interfering vehicles as well as other movable and immovable objects. New techniques are needed to test and train autonomous vehicle systems on realistic driving data taken from actual sensors.

SUMMARY

The disclosed subject matter is related to autonomous driving and in particular to perception systems for autonomous driving and data used to benchmark and train perception systems. In one aspect, a method of generating and applying driving data to an autonomous driving system is disclosed. The method includes determining three-dimensional bounding indicators for one or more first objects in road target information captured by a light detection and ranging (LIDAR) sensor; determining camera bounding indicators for one or more second objects in road image information captured by a camera sensor; processing the road image information to generate a camera matrix; determining projected bounding indicators from the camera matrix and the three-dimensional bounding indicators; determining, from the projected bounding indicators and the camera bounding indicators, associations between the one or more first objects and the one or more second objects to generate a combined target information; and applying, by the autonomous driving system, the combined target information to produce a vehicle control signal.

In another aspect, an apparatus is disclosed for generating and applying data to an autonomous driving system. The apparatus includes at least one processor and memory including executable instructions that when executed perform the foregoing method.

In another aspect, a non-transitory computer readable medium is disclosed for storing executable instructions for generating and applying data to an autonomous driving system. When the executable instructions are executed by at least one processor they perform the foregoing method.

The following features may be included in various combinations. The applying includes training the system using data for training and testing using a learning method such as a machine perception system, a computer vision system, a deep learning system, etc. that works by using previously collected road image information and previously collected road target information, wherein the training causes changes in the perception system before the perception system is used in a live traffic environment. The applying includes testing the perception system to evaluate a performance of the perception system without the perception system operating in a live traffic environment, wherein the testing results in the performance being evaluated as acceptable or unacceptable. The one or more first objects are the same as the one or more second objects. The camera matrix includes extrinsic matrix parameters and intrinsic matrix parameters. The intrinsic matrix parameters include one or more relationships between pixel coordinates and camera coordinates. The extrinsic matrix parameters include information about the camera's location and orientation. The camera bounding indicators and projected bounding indicators are two-dimensional. The associations are performed using an intersection over union (IOU) technique. The vehicle control signal includes one or more of vehicle steering, vehicle throttle, and vehicle braking control outputs.

The above and other aspects and features of the disclosed technology are described in greater detail in the drawings, the description and the claims.

DETAILED DESCRIPTION

Autonomous driving systems may be tested or trained using sensor data gathered from multiple sensors. For example, the autonomous driving system may be trained using data previously collected from multiple sensors in actual driving scenarios. The sensors may include cameras, light detection and ranging (LIDAR) sensors, and/or other sensors. For example, road image information or data may be collected during a testing session where the road image information is collected using a camera and stored for later training of an autonomous system. This previously collected image data may be referred to as previously collected road image information. Similarly, road target information may be collected during the testing session where road target information is collected using a LIDAR sensor and stored for later training of an autonomous driving system. This previously collected target data may be referred to as previously collected road target information.

Data from the sensors may be combined to generate "ground truth" data that then can be used by the autonomous driving system to train the autonomous driving system. The ground truth data can also be used to test the performance of the autonomous driving system without the autonomous driving system driving on roads on a real-time basis but instead using the previously collected and stored camera and LIDAR information. "Ground truth" data is data representing objects within the sensors' fields of view that has highly accurate location, size, and velocity information for the vehicles and objects in the driving scenario.

For training or testing an autonomous driving system, a portion of the ground truth data may be provided to the autonomous driving system, and the remaining ground truth data may be used to evaluate the performance during testing or to provide feedback during training. For example, camera and LIDAR data from one vehicle may be provided to the autonomous driving system for training or testing, and camera and LIDAR data from another vehicle may be added to evaluate the autonomous driving system. After training the autonomous driving system, the system may be used to autonomously drive a vehicle in real-time with traffic which may be referred to as a live traffic environment.

Figure 1:
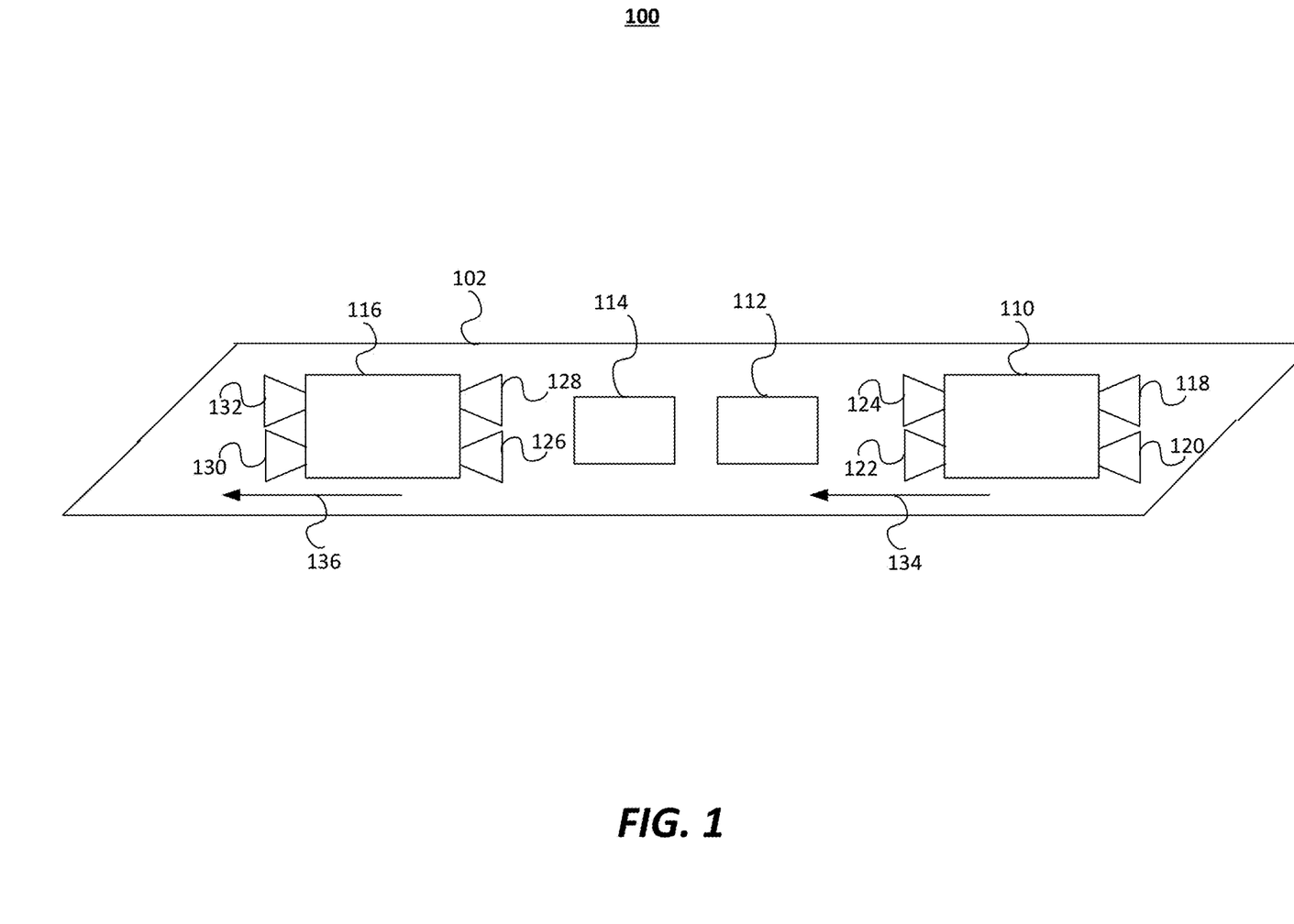
FIG. 1 is a schematic diagram of an exemplary system implementing the disclosed subject matter.

FIG. 1 is an example diagram 100 showing vehicles 110, 112, 114, and 116 travelling on road 102 with vehicles 110 and 116 travelling at velocities 134 and 136, respectively. Vehicles 110 and 116 include forward looking cameras 124 and 132 and rear looking cameras 118 and 128. Vehicles 110 and 116 also include forward looking light detection and ranging (LIDAR) 122 and 130 and rear looking LIDAR 120 and 126, respectively.

Cameras 124, 132, 118, and 128 can be any type of video or still camera such as charge-coupled device (CCD) image sensors, complementary metal oxide semiconductor (CMOS) image sensors, or any other type of image sensor. In some implementations, the cameras may capture images over a wide range of distances from the vehicle to which the camera is mounted. For example, the camera may capture images of objects very near such as 5 meters from the vehicle to which it is mounted, and the camera may capture in the same image objects up to or exceeding 1000 meters and all distances in between. Cameras 124, 132, 118, and 128 may be pointed in a fixed direction relative to the corresponding vehicle or may be steerable via mechanical steering of the camera or optical steering.

LIDAR 122, 120, 126, and 130 include laser-based or light emitting diode (LED)-based optical sensors including mechanically or otherwise scanned optical sensors. LIDAR can determine the precise distance to objects within its field. The LIDAR scanning then enables a determination of the three-dimensional positions of the objects. For example, the LIDAR can determine the positions of various exposed portions of a nearby vehicle. In some implementations, the LIDAR sensors may be limited to shorter distances than the cameras. For example, some LIDAR sensors are limited to approximately 100 m. In accordance with the disclosed subject matter, the two-dimensional image data from the cameras can be mapped to, or associated with, the three-dimensional LIDAR data.

In the illustrative example of FIG. 1, vehicle 110 is moving with velocity 134. Vehicle 116 is moving with velocity 136 which may be the same velocity as vehicle 110. Vehicles 112 and 114 lie between vehicles 110 and 116 and may move with the same average velocity as vehicles 110 and/or 116 but may move closer and farther from vehicles 110 and/or 116 over time. In the illustrative example of FIG. 1, vehicles 110 and 116 may be separated by 1000 m on road 102, vehicle 112 may be 50 m in front of vehicle 110 (and 950 m from vehicle 116), and vehicle 114 may be 250 m ahead of vehicle 110 (and 750 m behind vehicle 116). Camera 124 captures images/video of vehicles 112, 114 and 116. LIDAR 122 determines a precise distance (also referred to as a range) to various exposed portions of vehicle 112 and three-dimensional shape information about vehicle 112. In this illustrative example, vehicle 114 is out of range of LIDAR 122 but is captured by camera 124. Rear facing camera 128 captures images of vehicle 114, vehicle 112, and vehicle 110. Vehicles 114 and 112 are out of range from rear facing LIDAR 126 which, in this example, has a range of 100 m.

In the example of FIG. 1, camera 124 captures images of vehicles 112, 114, and 116. Imaging processing may be used to determine camera bounding boxes of objects in the images. Camera bounding boxes are determined as outlines of the largest portions of an object in view. For example, the camera bounding box for a delivery truck, or box truck, can be an outline of the back of the box truck. If multiple vehicles or objects are in an image, camera bounding boxes for each vehicle or object may be determined. Camera images are by their nature two-dimensional representations of the view seen by the camera.

Bounding boxes may also be determined from LIDAR data. For each object in view of LIDAR 122, a three-dimensional bounding box (also referred to herein as a LIDAR bounding boxes) may be determined from the LIDAR data. The LIDAR data also includes accurate distance (range) and velocity information between the LIDAR and the in-view portions of each target object. Further image processing may be used to associate the bounding boxes generated from camera 124 with the three-dimensional bounding boxes generated from LIDAR 122 to create ground truth data. For example, an intersection over union (IOU) method may be used to associate the road image bounding boxes with the three-dimensional bounding boxes. Other techniques may be used in addition to or in place of IOU to associate bounding boxes.

As used herein, a bounding box may also be referred to as a bounding indicator that is a boundary related to an object in a sensor result such as a camera image, a LIDAR image, a RADAR image, or another detection result of a sensor. The boundary (e.g., bounding box and/or bounding indicator) may have a shape such a rectangular, square, circular, trapezoidal, parallelogram, or any other shape. Stated another way, a bounding box may be shaped in a manner that is rectangular in some embodiments and that is not rectangular in other embodiments (e.g., as a circle or other non-rectangular shape). In some implementations, the boundary (e.g., bounding box and/or bounding indicator) may not have a named shape, or may follow the boundary of an arbitrarily-shaped object. The boundary (e.g., bounding box and/or bounding indicator) may be a two-dimensional boundary or a three-dimensional boundary of an object. The boundary (e.g., bounding box and/or bounding indicator) may be a voxel or a segmentation mask or map.

Rear facing camera 128 captures images of vehicles 114, 112, and 110. Imaging processing may be used to determine camera bounding boxes of objects in the images. In the foregoing example, vehicle 114 is 750 m behind vehicle 116 and thus out of range of rear facing LIDAR 126 on vehicle 116. While camera and LIDAR is being captured, vehicles 115 and 114 may move closer together and to within 100 m of each other when data from LIDAR 126 related to vehicle 114 may be collected. In some example embodiments, the LIDARs 120, 122, 126, and 130 may operate at ranges beyond 100 m such as 200 m or longer distance.

Image processing may also be used to associate the three-dimensional bounding boxes generated from LIDAR 126 to the objects viewable from the back of vehicle 116. In some example embodiments, LIDAR data including three-dimensional bounding boxes generated from LIDAR 126 on vehicle 116 can be combined with the image data from camera 124 and LIDAR sensor 122 on vehicle 110 to create ground truth data. For example, LIDAR data from LIDAR sensor 126 can be combined with the image data from camera 124 to improve the ground truth of the data that includes camera data from camera 124 and LIDAR 122.

For example, with vehicle 116 1000 m away from vehicle 110 and camera 124 having a 1000 m viewing range and LIDARs 122 and 126 having 100 m viewing range, ground truth data can be determined from the position of vehicle 110 to 100 m away via LIDAR 122, image only data can be generated at distances between 100 m and 900 m via camera 124, and ground truth may be determined between 900 m and 1000 m by combining camera 124 image data and LIDAR data from LIDAR 126. Image data from camera 128 may also be used in generating ground truth data.

In some example embodiments, the distance between vehicle 110 and vehicle 116 is varied over time as the image and LIDAR data is collected, or the distance is varied over successive runs of data collection. In one example, the distance between vehicles 110 and 116 is varied during a single data collection run. In another example, the distance between vehicles 110 and 116 is one value for one run, the data collection is stopped, the distance is changed, and data collection starts again. The data from the successive runs can be combined later using post processing.

In some example embodiments, bounding boxes generated from camera 124 image data can be associated with bounding boxes generated from LIDAR 122 data. Similarly, bounding boxes generated from camera 118 image data can be associated with bounding boxes generated from LIDAR 120, bounding boxes generated from camera 128 image data can be associated with bounding boxes generated from LIDAR 126 data, and bounding boxes generated from camera 132 image data can be associated with bounding boxes generated from LIDAR 130 data.

Figure 2:
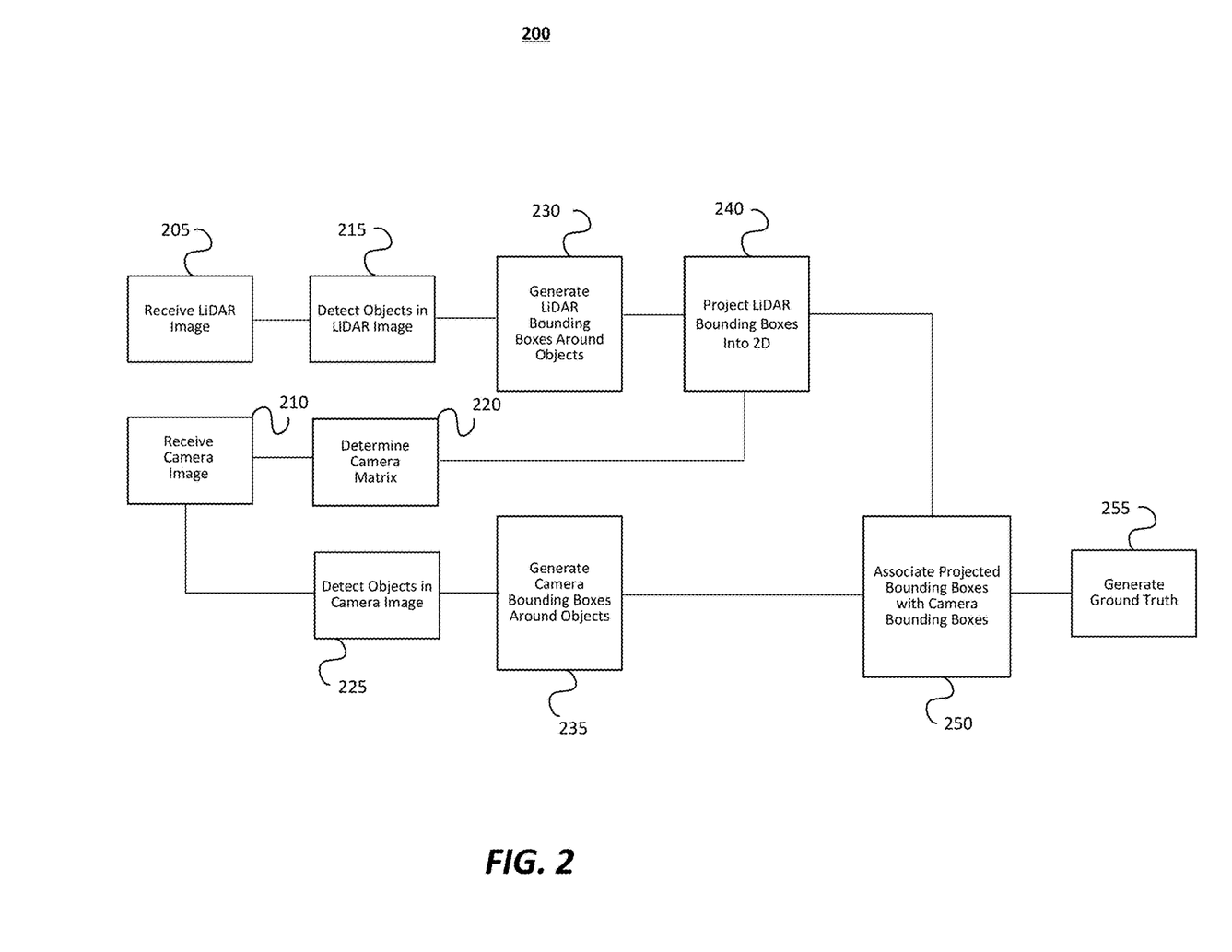
FIG. 2 is an example of a flow chart, in accordance with some embodiments.

FIG. 2 depicts an example of a process, in accordance with some embodiments. At step 205, a LIDAR image is received from a LIDAR sensor. At step 210, a camera image is received from a camera sensor. At step 215, objects are detected in the received LIDAR image. At step 225, objects are detected in the received camera image. Image detection includes identifying objects in the field of view of the camera and identifying objects in the field of view of the LIDAR sensor. Image detection may involve image processing performed by a computer and may include traditional processing, parallel processing or learning techniques.

At step 220, a camera matrix is determined based on the camera image. The camera matrix can be applied to transform 3-dimensional (3D) images from the LIDAR sensor into a 2-dimensional (2D) projection. For example, the process can determine the precise 3D bounding boxes in world coordinates from the LIDAR image. Then the process can use the camera extrinsic matrix to transform the coordinates from world coordinates into camera coordinates. Finally, the process may use the camera intrinsic matrix to transform the coordinates from camera coordinates to the image plane (also referred to as pixel coordinates), where the coordinates are two-dimensional. The camera matrices can be obtained from offline calibration.

At step 230, bounding boxes are generated from the detected objects in the LiDAR image. At step 240, the 3-D LIDAR images with LIDAR bounding boxes are projected into 2D using the camera matrix determined at step 220. At step 235, camera image bounding boxes are generated from the object detection in the camera image. At step 250, the LIDAR projected bounding boxes are associated with the camera image bounding boxes. The association can use an intersection over union (IOU) technique or another technique. At step 255, ground truth data is generated based on association of the projected bounding boxes from the LiDAR image with the camera bounding boxes.

In some example embodiments, bounding boxes are determined without performing LIDAR or camera image detection, or image detection is performed after bounding boxes are determined. For example, LIDAR bounding boxes generated at step 230 may be determined directly from a LIDAR image received at step 205 and/or camera image bounding boxes generated at step 235 may be determined directly from a camera image received at step 210. The bounding boxes may be determined, for example, by determining areas in an image that move together in successive frames without detecting any corresponding objects in those areas. Later, the detection of objects may be performed on the images within the bounding boxes, or in some implementations no object detection is performed.

Figure 3A:
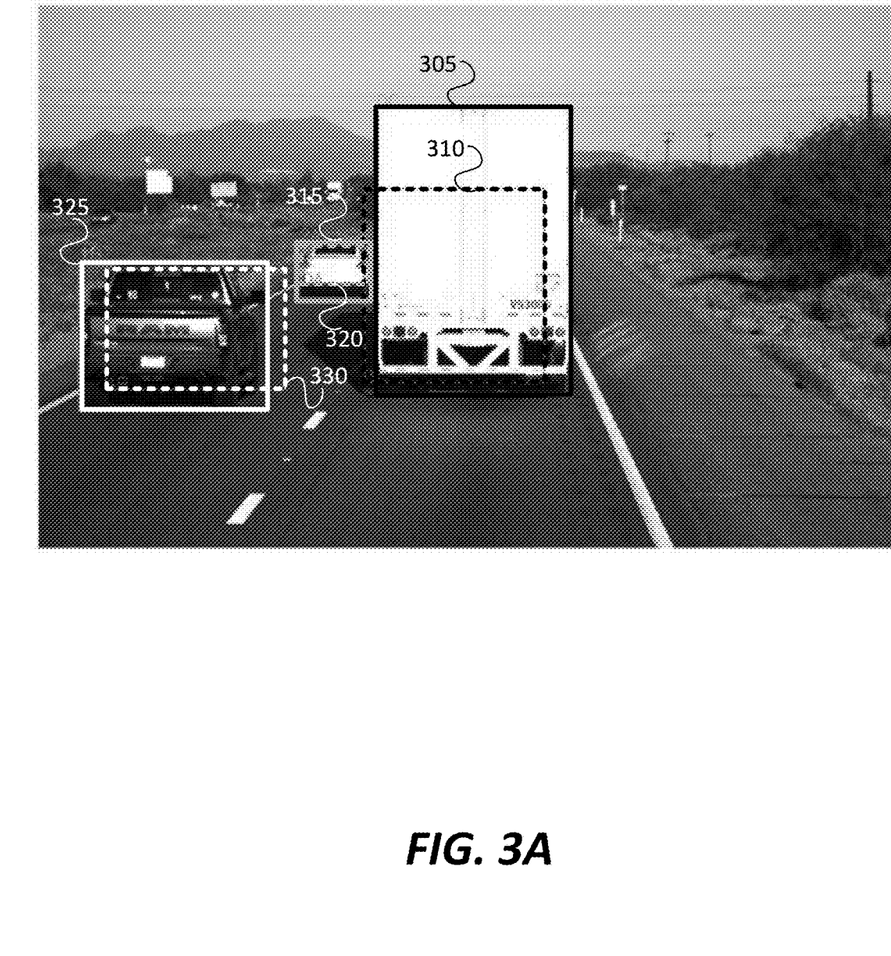
FIG. 3A depicts an example of a camera image and bounding boxes generated around objects of interest, in accordance with some embodiments.

FIG. 3A depicts examples of bounding boxes generated from camera data. Bounding boxes 310, 320, and 330 are generated from LIDAR data. Bounding boxes 305, 315, and 325 are generated from camera data. An association performed using, for example, IOU, has determined that the bounding boxes 305 and 310 correspond to the same object—the semi-truck, that bounding boxes 315 and 320 correspond to the same object—a first pick-up truck, and that bounding boxes 325 and 330 correspond to the object—a second pick-up truck.

Figure 3B:
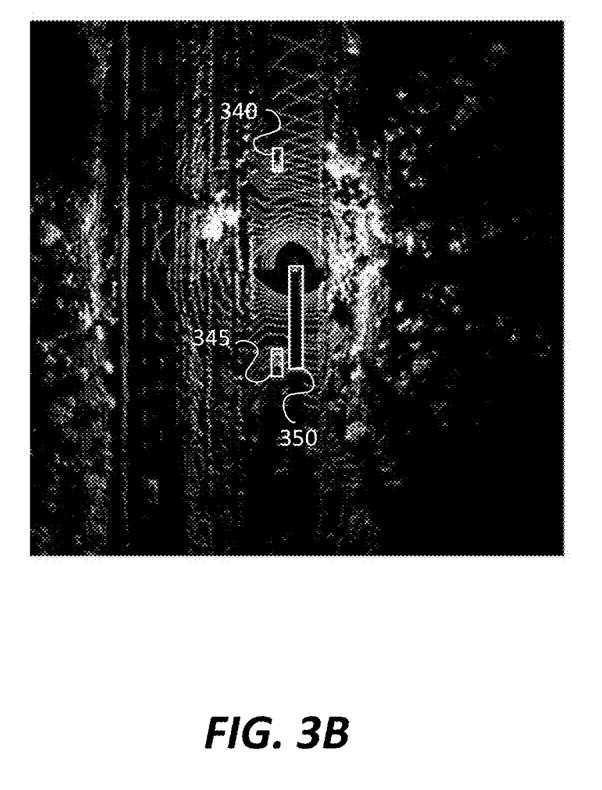
FIG. 3B depicts an example of a LIDAR image and bounding boxes generated around objects of interest, in accordance with some embodiments.

FIG. 3B depicts examples of bounding boxes generated from LIDAR data. Bounding boxes at 340, 345, and 350 correspond to examples of LIDAR bounding boxes before association with camera bounding boxes is performed.

In some implementations, two vehicles may be used to collect data simultaneously. In the example of FIG. 1, vehicle 116 may be referred to as a target vehicle and is in front of vehicle 110 which may be referred to as a source vehicle. Data from the two vehicles may be used to determine ground truth data for objects in the images form the camera of the source vehicle. In some implementations, the target vehicle has a LIDAR and the source vehicle has cameras. During data collection, the distance between the target vehicle and the source vehicle can be changed dynamically, in order to acquire ground truth data at the different ranges.

In some implementations, after the data is collected, the LIDAR detection and image detection is performed on the collected data via post processing. In this way, 3D information for each object in the LIDAR and the position of each object in the image can be determined.

In some implementations, after object detection in the camera images and object detection in the LIDAR images, one or more associations are made between the objects detected in the LIDAR images and objects detected in the camera images.

In some example embodiments, since the bounding boxes for each object are generated in 3D space from LIDAR data, the 3D bounding boxes can be projected into a 2D image plane through the camera extrinsic and intrinsic matrices. In this way, 3D bounding boxes from LIDAR data can be reflected in the image from the camera of the source vehicle. As such, two types of bounding boxes in the image include the original bounding boxes from image detection, and another that is a projected bounding box from LIDAR data.

The two types of bounding boxes are then associated with one another to determine how similar the two types of bounding boxes are. A technique such as intersection over union (IOU) can be used as a metric to find an association value representative of the two bounding boxes.

Intersection over union may be expressed as a ratio of the area of intersection between two bounding boxes divided by the area of the union of the two bounding boxes. For example, the IOU value for two bounding boxes that overlap exactly is 1, and the IOU value of the IOU for two bounding boxes that do not overlap at all is 0. Various overlapping regions will cause IOU values between 0 and 1. The more related or associated the bounding boxes are the closer the IOU value is to 1.

Another example of a technique for determining the relatedness of two bonding boxes is the Dice coefficient. The Dice coefficient is 2 times the area of overlap of the two bounding boxes divided by the total number of pixels in both bounding boxes. Another technique includes the generalized intersection over union (GIOU). Other techniques can also be used.

Figure 4:
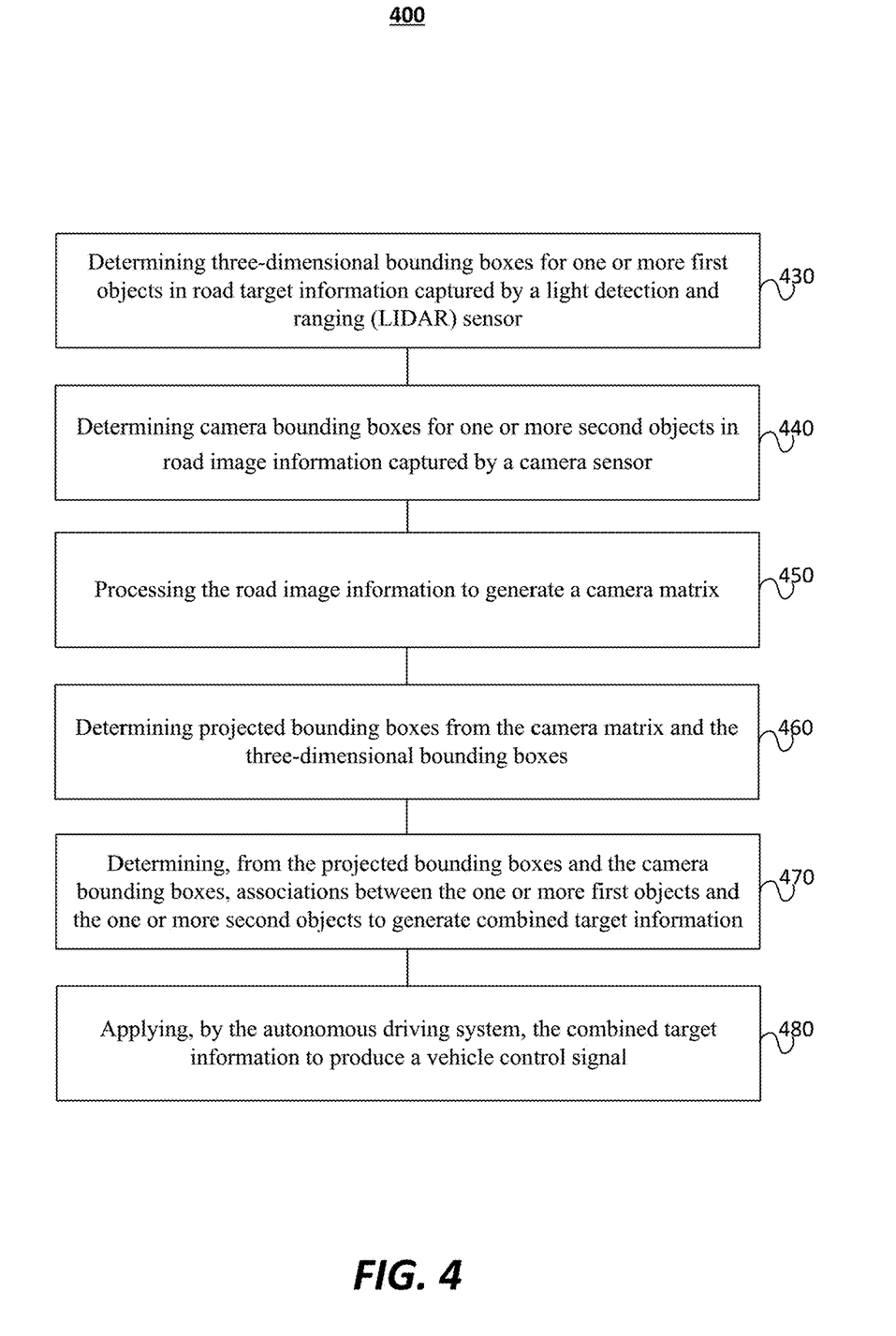
FIG. 4 is another example of a flow chart, in accordance with some embodiments.

FIG. 4 depicts another process 400, in accordance with some example embodiments. The process includes various features described above. At step 430, the process includes determining three-dimensional bounding boxes for one or more first objects in road target information captured by a light detection and ranging (LIDAR) sensor.

At step 440, the process includes determining camera bounding boxes for one or more second objects in road image information captured by a camera sensor. In some cases, the first objects and the second objects may be entirely different from each other. In some cases, some of the first objects may be same as some of the second objects. For example, the objects may be other cars on the road, traffic signs, pedestrians, road markers, buildings, curbs, and so on. As another example, the objects may be left and right turn signals of vehicles in front, braking lights of nearby vehicles, and so on.

At step 450, the process includes processing the road image information to generate a camera matrix. In various embodiments, the camera matrix may include intrinsic and/or extrinsic parameters, as described in the present document.

At step 460, the process includes determining projected bounding boxes from the camera matrix and the three-dimensional bounding boxes. In some embodiments, the camera bounding boxes and projected bounding boxes are two-dimensional.

At step 470, the process includes determining, from the projected bounding boxes and the camera bounding boxes, associations between the one or more first objects and the one or more second objects to generate combined target information. The present application discloses using various association techniques such as the IOU technique.

At step 480, the process includes applying, by the autonomous driving system, the combined target information to produce a vehicle control signal. The vehicle control signal may be a signal that is used for navigating the vehicle and/or for controlling another operation of the vehicle. Some examples include: a steering control that controls the direction in which the vehicle moves, a vehicle throttle control that controls the amount of fuel supplied to the engine, a vehicle braking control output that controls amount of braking applied to reduce speed of the vehicle, and so on.

In some embodiments, the foregoing applying operation may include training a perception system using previously collected road image information and previously collected road target information. In some embodiments, the training may result in changes in the perception system (e.g., newly trained decision algorithms or a different flow of logic) before the perception system is used in a live traffic environment. For example, live traffic environment may present to the perception system patterns and situations that have not been seen by the perception system and may result in further training of the perception system. A live traffic environment may also impose processing time constraints on the perception system to process data and produce the vehicle control signal.

In some embodiments, the applying operation may include testing a perception system to evaluate a performance of the perception system without the perception system operating in a live traffic environment. For example, the testing results in the performance being evaluated as acceptable or unacceptable. The evaluation may be performed by a computing system using one or more metrics applied to a response of the perception system to make the evaluation, or a human user may make the evaluation.

Figure 5:
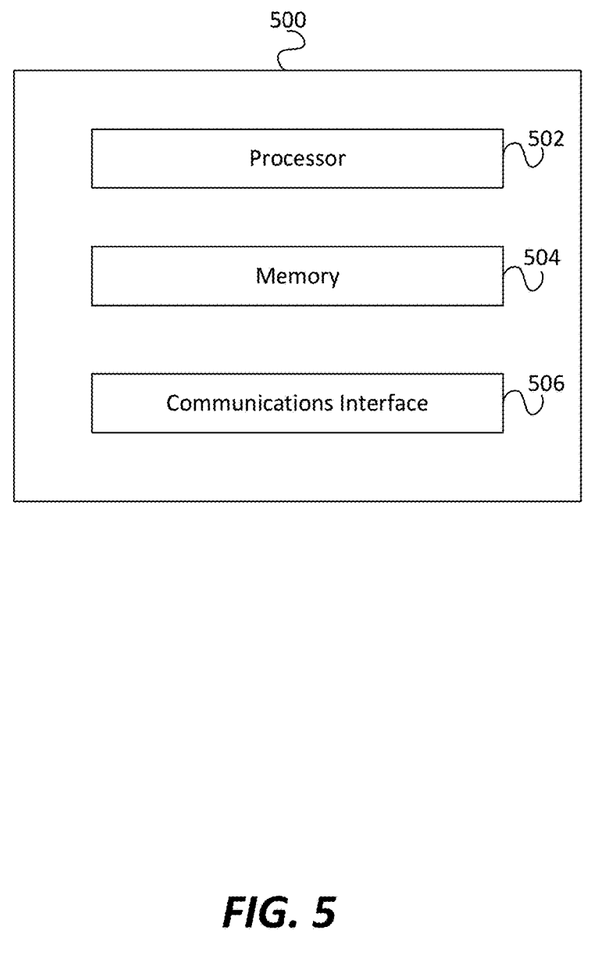
FIG. 5 depicts an example of a hardware platform, in accordance with some embodiments.

FIG. 5 depicts an example of a hardware platform 500 that can be used to implement some of the techniques described in the present document. For example, the hardware platform 500 may implement the process 400, or other processes described above, and/or may implement the various modules described herein. The hardware platform 500 may include a processor 502 that can execute code to implement a method. The hardware platform 500 may include a memory 504 that may be used to store processor-executable code and/or store data. The hardware platform 500 may further include a communication interface 506. For example, the communication interface 506 may implement one or more wired or wireless communication protocols (Ethernet, LTE, Wi-Fi, Bluetooth, and so on).

Benefits of the disclosed techniques include the following: First, ground truth (3D information) data can be collected and generated for camera-based perception, which can be used for both training, testing, and benchmarking. Second, by using two data collection vehicles, ground truth data can be generated for long ranges (e.g., in a radius of around 1,000 meters), which is not limited the short ranges of typical LIDAR perception. Moreover, ground truth data can not only be generated in front of the source vehicle but can also be generated for areas surrounding the source vehicle by adjusting the relative position of two vehicles over time during data collection. Furthermore, more than two vehicles (i.e., vehicles like 110 and 116 with cameras and LIDAR sensors) can be used to do the data collection, so that a longer range of ground truth data can be generated. In this situation, there is one source vehicle and all the others are target vehicles.

It will be appreciated that various techniques for training a perception system for autonomous driving are disclosed. In some implementations, known road and driving data is used for training and testing (benchmarking) for the perception system in the autonomous driving pipeline. Machine learning is one of the technologies used in training the perception system. In some implementations where a different set of computational resources are available, deep learning or computer vision may be used for the training and testing.

Implementations of the subject matter and the functional operations described in this patent document can be implemented in various systems, semiconductor devices, ultrasonic devices, digital electronic circuitry, or in computer software, firmware, or hardware, including the structures disclosed in this specification and their structural equivalents, or in combinations of one or more of them. Implementations of aspects of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of generating and applying driving data to an autonomous driving system, the method comprising:
   determining three-dimensional bounding indicators for one or more first objects in road target information captured by a light detection and ranging (LIDAR) sensor located on a first vehicle;
   determining camera bounding indicators for one or more second objects in road image information captured by a camera sensor located on a second vehicle, wherein the road target information is captured by the LIDAR sensor on the first vehicle and the road image information is captured by the camera sensor on the second vehicle as the first vehicle and the second vehicle are operating on a road and having a distance in between the first vehicle and the second vehicle;
   processing the road image information to generate a camera matrix;
   determining projected bounding indicators from the camera matrix and the three-dimensional bounding indicators;
   determining, from the projected bounding indicators and the camera bounding indicators, associations between the one or more first objects and the one or more second objects to generate a combined target information, wherein the projected bounding indicators and the camera bounding indicators are two-dimensional, wherein the combined target information comprises data that is generated based on the association of the projected bounding indicators with the camera bounding indicators; and
   applying, by the autonomous driving system, the combined target information to produce a vehicle control signal.

2. The method of claim 1, wherein the applying the combined target information to produce the vehicle control signal comprises training a perception system using previously collected road image information and previously collected road target information, and wherein the training causes changes in the perception system before the perception system is used in a live traffic environment.

3. The method of claim 1, wherein the applying the combined target information to produce the vehicle control signal comprises testing a perception system to evaluate a performance of the perception system without the perception system operating in a live traffic environment, and wherein testing results in the performance being evaluated as acceptable or unacceptable.

4. The method of claim 1, wherein the one or more first objects are the same as the one or more second objects.

5. The method of claim 1, wherein the camera matrix includes extrinsic matrix parameters and intrinsic matrix parameters.

6. The method of claim 5, wherein the intrinsic matrix parameters include one or more relationships between pixel coordinates and camera coordinates.

7. The method of claim 5, wherein the extrinsic matrix parameters include information about location and orientation of the camera sensor.

8. The method of claim 1, wherein the combined target information comprises ground truth data representing objects within fields of view of the camera sensor and the LIDAR sensor.

9. The method of claim 1, wherein the associations are performed using an intersection over union (IOU) technique.

10. The method of claim 1, wherein the vehicle control signal includes one or more of vehicle steering, vehicle throttle, and vehicle braking control outputs.

11. An apparatus for generating and applying data to an autonomous driving system, comprising:
at least one processor; and
memory including executable instructions that when executed perform at least:
receiving road image information from a camera sensor;
receiving road target information from a light detection and ranging (LIDAR) sensor;
determining three-dimensional bounding indicators for one or more first objects in the road target information captured by the light detection and ranging (LIDAR) sensor located on a first vehicle;
determining camera bounding indicators for one or more second objects in the road image information captured by the camera sensor located on a second vehicle, wherein the road target information is captured by the LIDAR sensor on the first vehicle and the road image information is captured by the camera sensor on the second vehicle as the first vehicle and the second vehicle are operating on a road and having a distance in between the first vehicle and the second vehicle;
processing the road image information to generate a camera matrix;
determining projected bounding indicators from the camera matrix and the three-dimensional bounding indicators;
determining, from the projected bounding indicators and the camera bounding indicators, associations between the one or more first objects and the one or more second objects to generate combined target information, wherein the projected bounding indicators and the camera bounding indicators are two-dimensional, wherein the combined target information comprises data that is generated based on the association of the projected bounding indicators with the camera bounding indicators; and
applying, by the autonomous driving system, the combined target information to produce a vehicle control signal.

12. The apparatus of claim 11, wherein the applying the combined target information to produce the vehicle control signal comprises training a perception system before the perception system is used in a live traffic environment, and wherein the training causes changes in the perception system.

13. The apparatus of claim 11, wherein the applying the combined target information to produce the vehicle control signal includes testing of a perception system that is evaluated as acceptable or unacceptable.

14. The apparatus of claim 11, wherein at least one of the one or more first objects is the same as at least one of the one or more second objects.

15. The apparatus of claim 11, wherein the camera matrix includes at least one of extrinsic matrix parameters or intrinsic matrix parameters.

16. The apparatus of claim 11, wherein the combined target information comprises ground truth data representing objects within fields of view of the camera sensor and the LIDAR sensor.

17. The apparatus of claim 11, wherein the associations are performed using an association technique different from an intersection over union (IOU) technique.

18. The apparatus of claim 11, wherein the vehicle control signal includes at least vehicle steering.

19. A non-transitory computer readable medium storing executable instructions for generating and applying data to an autonomous driving system that when executed by at least one processor perform at least:
determining three-dimensional bounding indicators for one or more first objects detected in road target information captured by a light detection and ranging (LIDAR) sensor located on a first vehicle;
determining camera bounding indicators for one or more second objects detected in road image information captured by a camera sensor located on a second vehicle, wherein the road target information is captured by the LIDAR sensor on the first vehicle and the road image information is captured by the camera sensor on the second vehicle as the first vehicle and the second vehicle are operating on a road and having a distance in between the first vehicle and the second vehicle;
processing the road image information to generate a camera matrix;
determining projected bounding indicators from the camera matrix and the three-dimensional bounding indicators;
determining, from the projected bounding indicators and the camera bounding indicators, associations between the one or more first objects and the one or more second objects to generate combined target information, wherein the projected bounding indicators and the camera bounding indicators are two-dimensional, wherein the combined target information comprises data that is generated based on the association of the projected bounding indicators with the camera bounding indicators; and
applying, by the autonomous driving system, the combined target information to produce a vehicle control signal.

20. The non-transitory computer readable medium of claim 19, wherein the applying comprises training a perception system, and wherein the training causes changes in the perception system.

* * * * *